United States Patent [19]

Huss

[11] Patent Number: 5,260,642

[45] Date of Patent: Nov. 9, 1993

[54] TORQUE DRIVEN DUAL PMG ACTUATOR

[75] Inventor: John B. Huss, Rockford, Ill.

[73] Assignee: Sundstrand Corporation, Rockford, Ill.

[21] Appl. No.: 693,729

[22] Filed: Apr. 30, 1991

[51] Int. Cl.⁵ ............................................. H02K 16/00
[52] U.S. Cl. ........................................ 322/51; 322/28; 310/93; 310/114
[58] Field of Search ................. 322/25, 27, 28, 29, 322/32, 44, 49, 50, 51, 52, 54, 55; 310/93, 190, 191, 114

[56] References Cited

U.S. PATENT DOCUMENTS

| | | | |
|---|---|---|---|
| 1,477,782 | 12/1923 | Steinmetz et al. | |
| 2,640,166 | 5/1953 | Zozulin et al. | 310/94 |
| 2,653,256 | 9/1953 | Walley et al. | 310/76 |
| 3,488,535 | 1/1970 | Baermann | 310/93 |
| 3,713,015 | 1/1973 | Frister | 322/28 |
| 4,244,545 | 9/1980 | Powell | 310/93 |
| 4,305,031 | 12/1981 | Wharton | 322/29 |
| 4,371,801 | 2/1983 | Richter | 310/156 |
| 4,517,505 | 5/1985 | Cunningham | 318/611 |
| 4,654,577 | 3/1987 | Howard | 322/28 |
| 4,663,581 | 5/1987 | Glennon | 322/52 |
| 4,728,841 | 3/1988 | Sugden | 310/114 |
| 4,766,362 | 8/1988 | Sadvary | 322/50 |
| 4,817,461 | 4/1989 | Iseman | 310/114 X |
| 4,879,484 | 11/1989 | Huss | 310/114 |
| 4,882,513 | 11/1989 | Flygare et al. | 310/114 |
| 4,885,493 | 12/1989 | Gokhale | 310/190 |
| 4,937,483 | 6/1990 | Matsui et al. | 310/105 |

FOREIGN PATENT DOCUMENTS

2007310 1/1970 France .................. 310/114

Primary Examiner—Kristine L. Peckman
Attorney, Agent, or Firm—Antonelli, Terry, Stout & Kraus

[57] ABSTRACT

A permanent magnet generator having a plurality of permanent magnet generator units which produce a controlled output potential for driving variable electrical load (20) by vectorially adding an output potential of the permanent magnet generator units to produce the controlled output potential in accordance with the invention which includes a plurality of permanent magnet rotors (12 and 14) mounted on a drive shaft (16) with at least one of the rotors being rotatable with respect to the drive shaft to vary an angular position of the at least one of the rotors relative to the shaft to produce a variable magnitude permanent magnetic field; at least one stator (24) magnetically coupled to the variable permanent magnetic field for producing the controlled output potential; and a torsion spring (30), coupled to the drive shaft and to the at least one rotor, for angularly positioning the rotors relative to each other so that the variable permanent magnetic field coupled to the at least one stator is zero in response to a stator fault.

20 Claims, 4 Drawing Sheets

TORQUE DRIVEN DUAL PMG ACTUATOR

CROSS-REFERENCE TO RELATED APPLICATION

Reference is made to U.S. Ser. No. 07/693,622, filed Apr. 30, 1991, entitled "Axial Gap Dual Permanent Magnet Generator", filed on even date herewith, which is assigned to the assignee of the present invention which application is incorporated by reference in its entirety.

TECHNICAL FIELD

The present invention relates to multiple permanent magnet generators which produce a controlled output potential.

BACKGROUND ART

The development of very high energy permanent magnets has made possible the design of permanent magnet generators (PMG) which equal or surpass wound field generators' specific output (KVA per unit weight). This has made PMG's an attractive alternative to wound field generators for aerospace electrical generating systems where weight is always a prime consideration.

Other potential advantages of PMGs over wound field generators are the elimination of the rotor field power and the greater magnitude rotor magnetic fields which are attainable with PMGs when compared to magnetic fields produced by rotors of wound field generators. The higher magnitude rotor magnetic fields produced by a PMG permit higher efficiency. The elimination of the rotor field power and the exciters, rotating rectifiers and other apparatus for providing the rotor field power save weight, permit higher speeds of operation, lower manufacturing costs and higher reliability. A PMG has a significant weight advantage in systems in which the frequency of generation of electrical power is not constant such as 400 Hz. Known systems that do not generate constant frequency AC power in airframes are 270 volt DC and variable speed constant frequency (VSCF) electrical power generating systems which are driven directly by a variable velocity power takeoff from an airframe propulsion engine.

However, PMG's when compared to wound field generators, have a disadvantage regarding the control of the output voltage and protection against electrical faults. These disadvantages result from the fact that the permanent magnet field produced by the rotor is fixed and cannot be turned off as is the case with the wound field generator.

Output voltage control of PMG's can be achieved by using a switching electronic regulator. However, for a typical aircraft power levels this requires heavy and expensive switching devices. Furthermore, substantial switching losses reduce system efficiency. Lessened reliability results as a consequence of the complexity of the switching electronic regulator.

Voltage control for permanent magnet generators has been provided by multiple permanent magnet generators having either one or more rotors or one or more stators which are rotated with respect to one or more rotors or stators to produce a variable magnitude magnetic excitation field which produces the generated output potential. The output voltage is regulated by the variation of the phase angle between the multiple generator outputs produced in a common stator winding or by varying the relative angular position of the stators which are magnetically coupled to the permanent magnet fields produced by the multiple rotors. Adjustment of the angle between the plural rotors or stators permits the reduction of the output potential of the generator to zero. However, during normal operation, large magnetic fluxes from the permanent magnet rotors are magnetically coupled to the stator which prevents the de-excitation of the stator to protect against faults in the stator winding.

U.S. Pat. Nos. 3,713,015, 4,305,031, 4,371,801, 4,663,581, 4,728,841, 4,817,461, 4,879,484 and 4,882,513 and French Patent 2,007,310 are representative of the aforementioned prior art. These systems use actuators to rotate a rotor or stator to vary a relative phase angle between the generator rotors or stators to provide voltage control. These systems are complex, expensive and require an energy source to power the actuator.

In the prior art the only protection against internal winding faults for single or multiple rotor PMG's has been to mechanically disconnect the rotor from the source of rotational energy to bring the rotors to rest. A mechanical disconnect is interposed between the prime mover and the drive shaft of the rotor to permit the disconnection. In prior art PMG's with multiple rotors, variation of the relative phase angle between the rotors may reduce the output potential to zero but does not decouple the permanent magnetic fields from the stator when the output potential is reduced to zero.

DISCLOSURE OF INVENTION

The present invention provides protection against internal faults for multiple rotor PMG's and a controlled output potential by rotating at least one rotor with respect to at least one other rotor in response to variation of the output potential of the generator at a point of reference when compared to a desired regulated output potential. With the invention, the exciting magnetic flux linking the PMG rotors and the stator is reduced to zero when the permanent magnetic field is axially linked between the permanent magnet rotors and at least one stator. The output potential is reduced to zero in response to a stator fault when the permanent magnetic field is radially linked between permanent magnet rotors and the at least one stator in response to a fault in the stator without requiring an external power source such as in the prior art where mechanical or electrical drives are utilized to rotate one or more rotors or stators with respect to a fixed rotor or stator to control output potential.

The invention utilizes a torsion spring which is coupled to a drive shaft on which the rotors of the permanent magnet generators are mounted and to at least one rotor which may be rotated relative to the drive shaft for positioning the rotors relative to each other so that the permanent magnetic field coupled to at least one stator or the output potential is zero in response to a winding fault. An eddy current brake applies braking torque to the at least one rotor during the generation of the controlled output potential to cause additional twisting of the torsion spring to increase the permanent magnetic field coupled to the at least one stator. An increase in electrical load driven by the generator applies increased torque to the plurality of permanent magnet rotors which causes additional twisting of the torsion spring to cause increasing of the permanent magnetic field coupled to the at least one stator to generate increased electrical power at the regulated output potential to drive the increased electrical load. A constant speed drive may be used to drive the drive shaft on which the permanent magnet rotors are mounted.

The torsion rate of the torsion spring is chosen such that the torque applied by the at least one rotor to the torsion spring, without torque applied by the eddy current brake, produces relative rotation of the at least one rotor which produces an output potential less than the desired regulated potential. The magnitude of the braking torque applied to the at least one rotor is minimized to a level only sufficient to increase the voltage to the regulated output potential. As a result, the size of the eddy current brake may be minimized to minimize any weight penalty produced by the eddy current brake which is of importance when the generating unit of the present invention is utilized in an airframe environment.

The present invention is also applicable to multiple permanent magnet rotor generating units of the aforementioned type which are driven by a variable speed drive for producing a controlled output potential having either an axial or radial coupling of the permanent magnetic field between permanent magnet rotors and at least one stator. In this embodiment, a plurality of torsion springs are utilized which are sequentially coupled to both of the drive shaft and the at least one rotor which is rotatable relative to the drive shaft to increase the torsion rate in steps as the rotational velocity of the drive shaft decreases from a highest velocity to a lowest velocity which correspond to the lowest and highest torque loadings applied to the at least one rotor in producing the controlled output potential. Each of the at least one additional torsion spring engages both the drive shaft and the at least one rotor at a different speed between the lowest and highest speed to produce the aforementioned step increases in torsion between the at least one rotor and the drive shaft. The at least one additional torsion spring has a first end which is attached to the at least one rotor and a second end which slides with respect to an arcuate slot in the drive shaft until being stopped with respect to the shaft at a speed between the lowest and highest speed.

A permanent magnet generator having a plurality of permanent magnet generator units which produce a controlled output potential for driving a variable electrical load by vectorially adding an output potential of the permanent magnet generator units to produce the controlled output potential in accordance with the invention includes a plurality of permanent magnet rotors mounted on a drive shaft with at least one of the rotors being rotatable with respect to the drive shaft to vary an angular position of the at least one of the rotors relative to the drive shaft to produce a variable permanent magnetic field; at least one stator magnetically coupled to the variable magnetic field for producing the controlled output potential; and a torsion spring coupled to the drive shaft and to the at least rotor for positioning the rotors relative to each other so either the permanent magnetic field coupled to the at least one stator or the output potential is zero in response to a winding fault. An eddy current brake is provided for applying braking torque to the at least one rotor during generation of the controlled output potential to cause twisting of the torsion spring to increase the permanent magnetic field coupled to the at least one stator. An increase in the electrical load driven by the generator applies in torque to the plurality of permanent magnet rotors which causes additional twisting of a torsion spring to cause increasing of the permanent magnet field coupled to the at least one stator. A constant speed drive drives the drive shaft at constant velocity during generation of the controlled output potential.

A voltage regulator is coupled to a point of regulation for producing an eddy current brake control signal which is a function of a difference between a potential at the point of regulation and a reference voltage; at least one winding is disposed on the eddy current brake for producing a variable magnitude magnetic field coupled to the at least one rotor from the eddy current brake for producing the braking torque; and wherein the eddy current brake control signal is applied to the at least one winding to cause current to flow in the at least one winding to produce the variable magnetic field coupled to the at least one rotor from the eddy current brake producing the controlled output potential. Torque applied by the at least one rotor to the torsion spring, without torque applied by the eddy current brake, produces relative rotation of the at least one rotor which causes an output potential to be produced less than the regulated potential.

Another embodiment of the present invention of the type described above utilizes a variable speed drive for driving the drive shaft between lowest and highest speeds and has at least one additional torsion spring coupled to the drive shaft and the at least one rotor for a speed range of rotation of the drive shaft from the lowest speed of rotation of the drive shaft for generating the controlled output potential up to a speed of rotation less than the highest speed of rotation of the drive shaft for generating the controlled output potential with all of the at least one additional torsion springs being coupled to the drive shaft and the at least one rotor at the lowest speed of rotation and none of the additional torsion springs being coupled to both the drive shaft and the at least one rotor at the highest speed. Each of the at least one additional torsion spring engages both the drive shaft and the at least one rotor at a different speed between the lowest and highest speed. The at least one additional torsion spring has a first end which is attached to the at least one rotor and a second end which slides with respect to the arcuate slot in the drive shaft until being stopped with respect to the shaft at a speed between the lowest and highest speed.

BEST MODE FOR CARRYING OUT THE INVENTION

Figure 1:
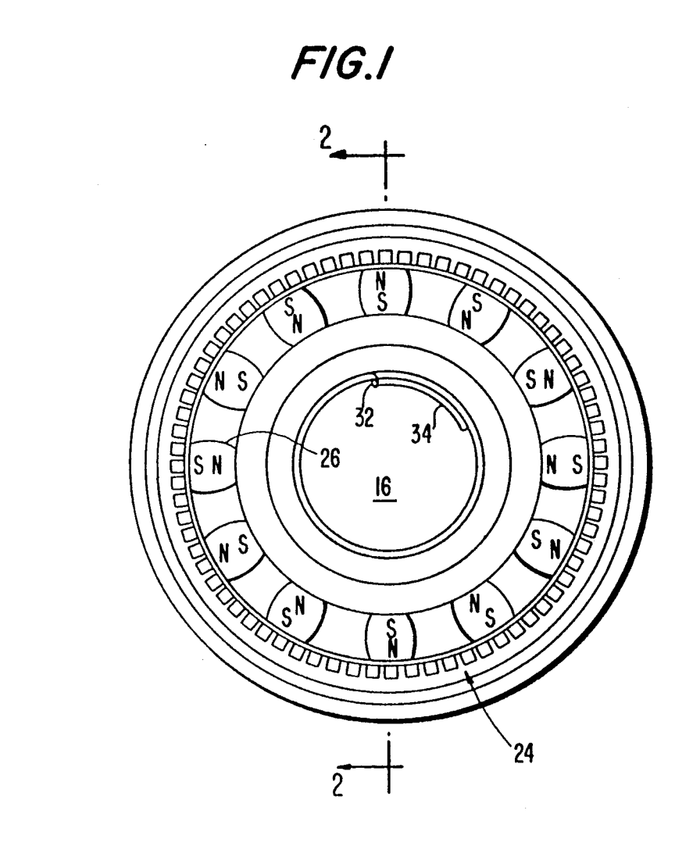
FIGS. 1 and 2 illustrate a first embodiment of the present invention.
Figure 2:
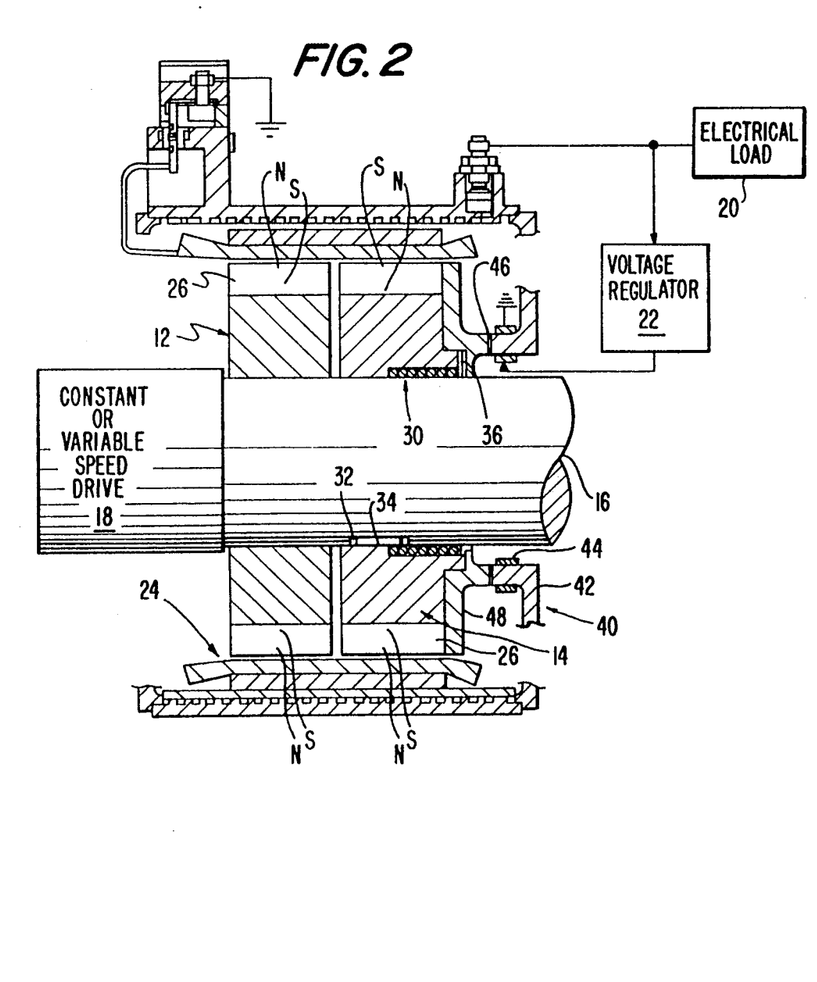

FIGS. 1 and 2 illustrate a first embodiment of the present invention in which like reference numerals identify like parts. First and second permanent magnet rotors 12 and 14 are rotatably driven by drive shaft 16. The drive shaft 16 is driven by a constant or variable speed drive 18. The constant speed drive may be in accordance known constant speed drives utilized in the aircraft industry for generation of electrical power. The variable speed drive may be a power takeoff from a variable speed prime mover such as a propulsion engine utilized in an airframe. As illustrated, the generating unit of the first embodiment is dual permanent magnet generator but it should be understood that the present invention is not limited to two permanent magnet rotors 12 and 14 as illustrated.

The generator output to an electrical load 20 is controlled by voltage regulator 22 to produce a controlled output potential which is preferably fixed. The voltage regulator 22 is discussed below with reference to FIG. 3. Stator 24 produces the generator output potential by being radially magnetically coupled to a series of circumferentially mounted permanent magnets 26 which are attached to the rotors 12 and 14 at angularly spaced positions as illustrated in FIG. 1. Non-magnetically permeable material within the rotors separates adjacent permanent magnets 26. Radial magnetic coupling of the permanent magnet fields produced by rotation of the permanent magnets 26 to the stator 24 produces the controlled output potential. It should be understood that the present invention is not limited to the radial flux coupling between the permanent magnets 26 and the stator 24 and may be applicable to axial flux coupling between the permanent magnets 26 and the plurality of stators respectively mounted outboard of the rotors 12 and 14. Application Ser. No. 07/693,622, filed Apr. 30, 1991, entitled "Axial Gap Dual Permanent Magnet Generator" discloses examples of axially flux coupled generators which may be utilized in practicing the present invention.

Figure 6:
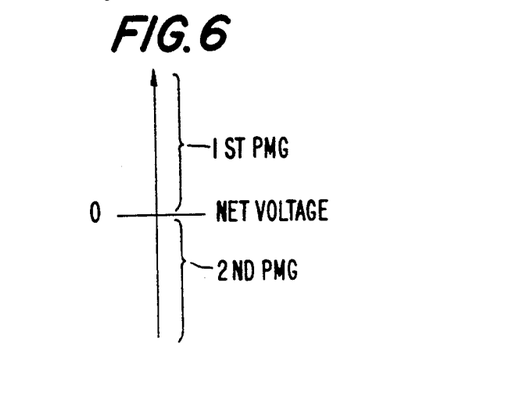

Voltage regulation of the output potential is controlled by causing relative rotation of the rotors 12 and 14 to vary the net radial flux. The first rotor 12 is fixedly mounted to the drive shaft 16. The second rotor 14 is journalled on the drive shaft 16. Rotation of the second rotor 14 is restricted by a torsion spring 30 having a first end 32 which contacts shoulder 34 and a second end 36 which is fixedly attached to the second rotor 14. In generators in accordance with the present invention which have radial flux coupling, the torsion spring 30 in response to a stator fault causes the output potential to go to zero as illustrated in FIG. 6 discussed below and in generators which have axial flux coupling the torsion spring in response to a stator fault causes both the permanent magnetic flux coupled to stator 24 and the output potential to go to zero. The second rotor 14 may be rotated relative to the drive shaft 16 with rotation causing twisting of the torsion spring 30. When the generating unit of the first embodiment is at rest, the adjacent poles 26 are aligned as illustrated in FIG. 2. Furthermore, the adjacent poles are aligned as in FIG. 2 in response to a winding fault in stator 24 so that the net permanent magnet flux coupled to the stator 24 from the magnets 26 produces zero voltage.

An eddy current brake 40 applies braking torque to the at least one rotor 14 during generation of the controlled output potential to cause additional twisting of the torsion spring 30 to increase the permanent magnetic field coupled to the at least one stator 26. The amount of twisting produced by the eddy current brake 40 is that which is required to vary the relative phase between the first rotor 12 and the second rotor 14 to produce the regulated output potential which is applied to the electrical load at point 20. The potential at point of reference 20 is compared by voltage regulator 22 to the desired regulated output potential to produce an eddy current CONTROL SIGNAL which varies the bra applied to the at least one rotor 14 by the eddy current brake 40 to produce the regulated output potential. The generation of the eddy current control signal is discussed below with reference to FIG. 3.

Preferably, the eddy current brake 40 contains a plurality of salient poles 42 on which are wound one or more windings 44 for producing the variable magnetic braking torque. The salient poles have a face 46 which is aligned with a magnetically permeable annulus 48 which is attached to the permanent magnet rotor 14 to apply the braking torque produced by the eddy current brake 40 directly to the permanent magnet rotor 14.

Torque applied by the at least one rotor 14 to the torsion spring 30 during generation of the regulated output potential, without torque applied by the eddy current brake 40, produces relative rotation of the at least one rotor which causes an output potential to be produced less than the regulated output potential. When the torsion rate of the torsion spring 30 is chosen to be slightly less than that which produces relative rotation of the first and second rotors 12 and 14 to produce the regulated output potential the smallest possible amount, the eddy current brake 40 may be downsized to its minimum size because of its minimal torque generating requirement to produce the regulated output potential which is of significance in airframe applications.

The great majority of the energy required to rotate the rotors 12 and 14 to a position to produce the regulated output potential is supplied from the constant speed or variable speed drive 18 which is unlike the prior art that relied on mechanical or electrical actuators which were complex. The energy supplied by the eddy current brake 40 is only necessary to provide a small amount of braking torque, in addition to the torque applied by tee interaction of the magnetic field from the permanent magnet rotors 12 and 14 and the stator 24, sufficient to produce the additional amount of relative rotation of the rotors 12 and 14 to produce the regulated output potential. The control of the relative rotation of the rotors 12 and 14 is produced by the combination of the torsion spring 30 and the eddy current brake 40 without the addition of substantial weight.

It should be understood that while the eddy current brake 40 is illustrated as having salient poles, other forms of eddy current brakes may be utilized in the practicing of the present invention and the present invention is not limited to any particular design of torsion spring 30 or mechanism for coupling the torsion spring between the drive shaft 16 and the at least one rotor 14. Furthermore, other types of brakes, which may be controlled in a manner analogous to the eddy current brake 40, may be used in practicing the invention.

Figure 3:
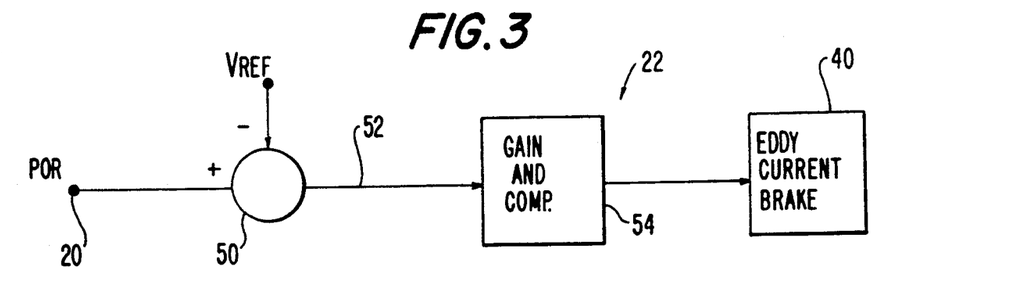
FIG. 3 illustrates a schematic of the voltage regulator of the first embodiment of the invention.

FIG. 3 illustrates a voltage regulator 22 which may be used in practicing the present invention. The voltage regulator 22 operates as a conventional voltage regulator in generating an error signal proportional to a difference between a potential at a point of reference and a reference voltage which is used for controlling the magnitude of the magnetic field coupled from the rotors 12 and 14 to the stator 24. The point of reference 20 is compared by a summer 50 to a voltage reference which is the desired regulated output potential to produce the error signal 52. The error signal 52 is applied to a gain and compensation block 54 to produce the EDDY CURRENT BRAKE CONTROL SIGNAL which varies the magnitude of the braking torque produced by the eddy current brake 40 as explained above with reference to FIG. 1 to cause the generator to produce the regulated output potential. It should be understood that the present invention is not limited to any particular type of voltage regulator 22.

Figure 4:
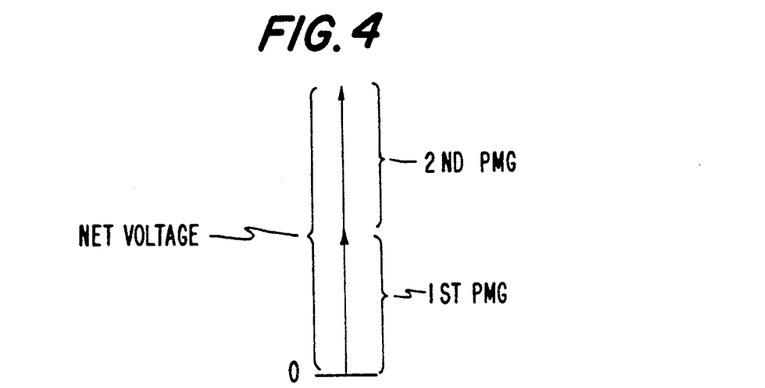
FIGS. 4-6 illustrate the vectorial adding of voltages produced by the first and second rotors of the first embodiment to produce the controlled output potential.
Figure 5:
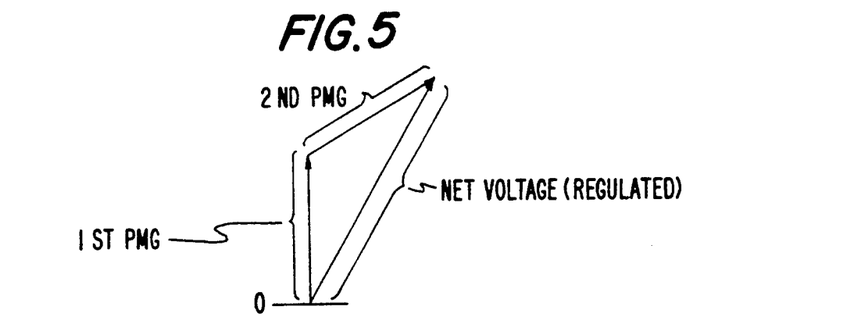

FIGS. 4-6 illustrate the generation of the output potential by a generating unit in accordance with the present invention resultant from the vectorial adding of the output potentials produced by the first and second rotors 12 and 14. FIG. 4 illustrates the generation of the maximum output potential of the generator exceeding the regulated potential which is identified by "net voltage" when the first and second rotors are phase aligned to couple maximum magnetic flux to the stator 24. FIG. 5 illustrates the generation of an output potential which is controlled by the voltage regulator which occurs as a consequence of the permanent magnet rotors 12 and 14 being rotated out of phase to produce a combined output voltage identified by "net voltage" which is the regulated output voltage. FIG. 6 illustrates the generation of a zero output potential which occurs when the first and second rotors are totally out of phase with each other in response to a stator fault such as when zero magnetic flux is coupled to the permanent magnet generator with a generator using axial flux linkage between the permanent magnet rotors and at least one stator. Zero output potential is produced when either the constant or variable speed drive 18 is stopped or when a winding fault occurs in the stator 24 which results in the output potential going to zero. The inherent deactivating of the multiple permanent magnet generator units in coupling a magnetic field to the stator 24 in generators using axial flux linkage between the permanent magnet rotors and at least one plate during a stator fault has the benefit of preventing potential damage to the stator which could occur in the time interval during which the mechanical disconnect of the prior art required to perform disconnection and further provides a simplified mechanism for deactivating the stator.

Figure 7:
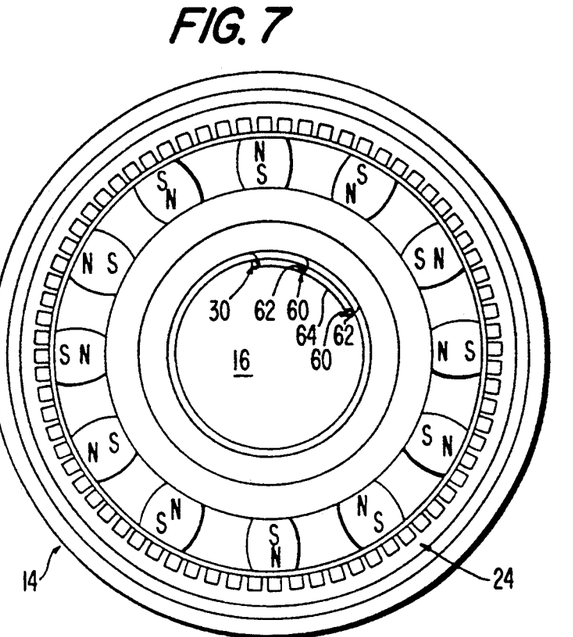
FIGS. 7-9 illustrate an end view of a rotor and shaft of a second embodiment of the present invention which produces a controlled output potential for variable drive speeds in which multiple torsion springs connect the rotor to the drive shaft.
Figure 8:
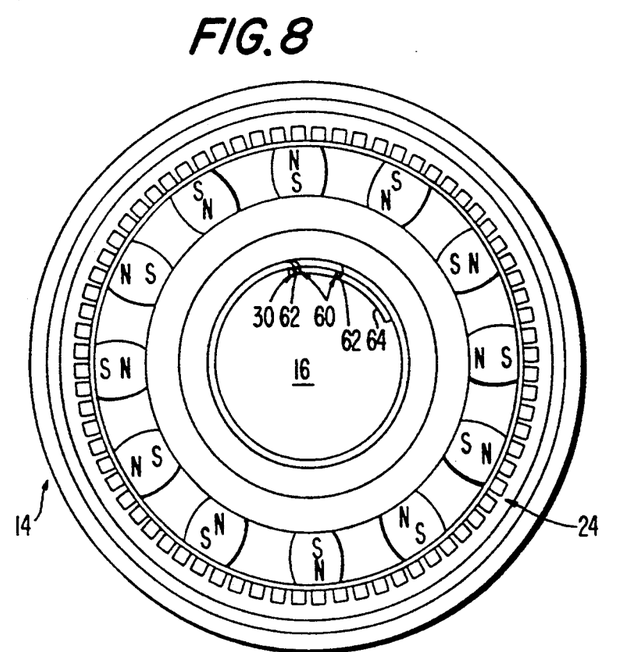
Figure 9:
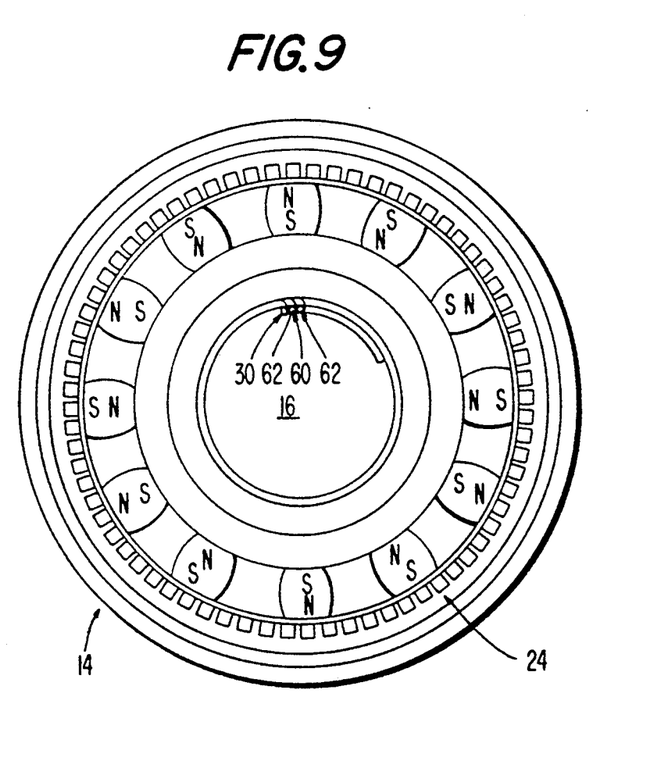

FIGS. 7-9 illustrate an endview of the rotor 14 utilized in a second embodiment of the invention which is designed for operation as a variable speed multiple permanent magnet generator having a regulated output potential as illustrated in FIGS. 1 and 2. The difference between the first embodiment as illustrated in FIGS. 1 and 2 and the second embodiment of FIGS. 7-9 is the addition of at least one additional torsion spring 60. The at least one additional torsion spring 60 is coupled to the drive shaft 16 and the at least one rotor 14 for a speed range of rotation of the drive shaft from a lowest speed of rotation of the drive shaft for generating the controlled output potential up to a speed of rotation less than a maximum speed of rotation of the drive shaft for generating the controlled output potential. Each of the at least one additional torsion springs 60 is coupled to the drive shaft 16 and the at least one rotor 14 at the lowest speed of rotation and none of the additional torsion springs is coupled to both the drive shaft 16 and the at least one rotor 14 at the highest speed of rotation. At the highest speed of rotation, only the torsion spring 30 is coupled to both of the at least one rotor 14 and the drive shaft 16 as described above with reference to FIGS. 1 and 2. Each of the at least one additional torsion spring 60 engages both the drive shaft 16 and the at least one rotor 14 at a different speed between the lowest and highest speed. One end of each spring is secured to one of the rotor 14 or the drive shaft 16 with the attachment to the rotor being preferred as illustrated.

The other end 62 slides in a slot 64 in the shaft 16 until the torque applied to the rotor 14 increases enough to shift the rotor so that the free end 62 butts up against the shoulder of the slot or an end of another spring 60.

FIGS. 7-9 respectively illustrate successively lower rotational speeds when each of the at least one additional spring 60 is successively coupled to both of the rotor 14 and the drive shaft 16. As a result, the torsion rate of the spring coupling between the rotor 14 and the drive shaft 16 increases in steps as each additional spring 60 has its free end contacting the shoulder of slot 64 or another spring 60 which occurs at different points in the operational speed range produced by the variable speed drive 18 in driving the drive shaft from the highest rotational rate to the lowest rotational rate.

While the invention has been described in terms of its preferred embodiments, it should be understood that numerous modifications may be made thereto without departing from the spirit and scope of the invention. For example, the present invention is not limited to the number of permanent magnet rotors, the number of stators or the magnetic flux linkages as described above with reference to the present invention. It is intended that all such modifications fall within the scope of the appended claims.

I claim:

1. A permanent magnet generator having a plurality of permanent magnet generator units which produce a controlled output potential for driving a variable electrical load by vectorially adding an output potential of the permanent magnet generator units to produce the controlled output potential comprising:

a plurality of permanent magnet rotors mounted on a drive shaft with at least one of the rotors being rotatable with respect to the drive shaft to vary an annular position of the at least one of the rotors relative to the shaft to produce a variable magnitude permanent magnetic field;

at least one stator magnetically coupled to the variable magnitude permanent magnetic field for producing the controlled ouput potential; and a torsion spring coupled to the drive shaft and to the at least one of the rotors for angularly positioning the rotors relative to each other so that either the variable permanent magnetic field coupled to the at least one stator or the controlled output potential is zero in response to a stator fault.

2. A permanent magnet generator in accordance with claim 1 further comprising:

an eddy current brake for apply braking torque to the at least one of the rotors during the generation of the controlled output potential to cause twisting of the torsion spring to increase the variable permanent magnetic field coupled to the at least one stator.

3. A permanent magnet generator in accordance with claim 2 wherein:

an increase in the variable electrical load driven by the generator applies increased torque to the plurality of permanent magnet rotors which causes additional twisting of the torsion spring to cause increasing of the variable permanent magnetic field coupled to the at least one stator.

4. A permanent magnetic generator in accordance with claim 1 further comprising:

a constant speed drive for driving the drive shaft at constant velocity during generation of the controlled output potential.

5. A permanent magnetic generator in accordance with claim 2 further comprising:
a constant speed drive for driving the drive shaft at constant velocity during generation of the controlled output potential.

6. A permanent magnetic generator in accordance with claim 3 further comprising:
a constant speed drive for driving the drive shaft at constant velocity during generation of the controlled output potential.

7. A permanent magnet generator in accordance with claim 2 further comprising:
a voltage regulator, coupled to a point of regulation, for producing an eddy current brake control signal which is a function of a difference between a potential at the point of regulation and a reference voltage;
at least one winding disposed on the eddy current brake for producing a variable magnitude magnetic field producing the braking torque; and wherein
the eddy current brake control signal is applied to the at least one winding to cause current to flow in the at least one winding to produce the braking torque which causes rotation of the at least one rotor to produce the variable magnitude magnetic field producing the controlled output potential.

8. A permanent magnet generator in accordance with claim 7 wherein:
a torque applied to the at least one of the rotors to the torsion spring, without torque applied by the eddy current brake, produces relative rotation or the at least one rotor which causes an output potential to be produced less than the controlled output potential.

9. A permanent magnet generator in accordance with claim 3 further comprising:
a voltage regulator, coupled to a point of regulation, for producing an eddy current brake control signal which is a function of a difference between a potential at the point of regulation and a reference voltage;
at least one winding disposed on the eddy current brake for producing a variable magnitude magnetic field producing the braking torque; and wherein
the eddy current brake control signal is applied to the at least one winding to cause current to flow in the at least one winding to produce the braking torque which causes rotation of the at least one rotor to produce the variable magnitude magnetic field producing the controlled output potential.

10. A permanent magnet generator in accordance with claim 9 wherein:
a torque applied by the at least one of the rotors to the torsion spring, without torque applied by the eddy current brake, produces relative rotation of the at least one rotor which causes an output potential to be produced less than the controlled output potential.

11. A permanent magnet generator in accordance with claim 4 further comprising:
a voltage regulator, coupled to a point of regulation, for producing an eddy current brake control signal which is a function of a difference between a potential at the point of regulation and a reference voltage;
at least one winding disposed on the eddy current brake for producing a variable magnitude magnetic field producing the braking torque; and wherein
the eddy current brake control signal is applied to the at least one winding to cause current to flow in the at least one winding to produce the braking torque which causes rotation of the at least one rotor to produce the variable magnitude magnetic field producing the controlled output potential.

12. A permanent magnet generator in accordance with claim 11 wherein:
a torque applied by the at least one of the rotors to the torsion spring, without torque applied by the eddy current brake, produces relative rotation of the at least one rotor which causes an output potential to be produced less than the controlled output potential.

13. A permanent magnet generator in accordance with claim 5 further comprising:
a voltage regulator, coupled to a point of regulation, for producing an eddy current brake control signal which is a function of a difference between a potential at the point of regulation and a reference voltage;
at least one winding disposed on the eddy current brake for producing a variable magnitude magnetic field producing the braking torque; and wherein
the eddy current brake control signal is applied to the at least one winding to cause current to flow in the at least one winding to produce the braking torque which causes rotation of the at least one rotor to produce the variable magnitude magnetic field producing the controlled output potential.

14. A permanent magnet generator in accordance with claim 13 wherein:
a torque applied by the at least one of the rotors to the torsion spring, without torque applied by the eddy current brake, produces relative rotation of the at least one rotor which causes an output potential to be produced less than the controlled output potential.

15. A permanent magnet generator in accordance with claim 6 further comprising:
a voltage regulator, coupled to a point of regulation, for producing an eddy current brake control signal which is a function of a difference between a potential at the point of regulation and a reference voltage;
at least one winding disposed on the eddy current brake for producing a variable magnitude magnetic field producing the braking torque; and wherein
the eddy current brake control signal is applied to the at least one winding to cause current to flow in the at least one winding to produce the braking torque which causes rotation of the at least one rotor to produce the variable magnitude magnetic field producing the controlled output potential.

16. A permanent magnet generator in accordance with claim 15 wherein:
a torque applied by the at least one of the rotors to the torsion spring, without torque applied by the eddy current brake, produces relative rotation of the at least one rotor which causes an output potential to be produced less than the controlled output potential.

17. A permanent magnet generator in accordance with claim 1 further comprising:
at least one additional torsion spring coupled to the drive shaft and the at least one of the rotors for a speed range of rotation of the drive shaft from a lowest speed of rotation of the drive shaft for generating the controlled output potential up to a speed of rotation less than a highest speed of rotation of the drive shaft for generating the controlled output potential with all of the at least one additional torsion spring being coupled to the drive shaft and the at least one of the rotors at the lowest speed of rotation and none of the at least one additional torsion spring being coupled to both the drive shaft and the at least one of the rotors at the highest speed of rotation; and a variable speed drive for driving the drive shaft between the lowest and highest speeds.

18. A permanent magnet generator in accordance with claim 17 wherein:

each of the at least one additional torsion spring engages both the drive shaft and the at least one one of the rotors at a different speed between the lowest and highest speeds.

19. A permanent magnet generator in accordance with claim 17 wherein:

the at least one additional torsion spring has a first end which is attached to the at least one one of the rotors and a second end which slides with respect to an acruate slot in the drive shaft until being stopped with respect to the shaft at a speed between the lowest and highest speeds.

20. A permanent magnet generator in accordance with claim 18 wherein:

the at least one additional torsion spring has a first end which is attached to the at least one of the rotors and a second end which slides with respect to an arcuate slot in the drive shaft until being stopped with respect to the shaft at a speed between the lowest and highest speeds.

* * * * *